Patented Mar. 20, 1934

1,951,356

UNITED STATES PATENT OFFICE 1,951,356

COLLOIDAL BROMIDE AND PROCESS OF MAKING THE SAME

Ernest Govett, deceased, late of New York, N. Y., by Ernest H. Govett and Agnes H. Govett, executors, New York, N. Y.; said Ernest Govett assignor to Govett, Ltd., New York, N. Y., a corporation of New York No Drawing. Original application March 20, 1928, Serial No. 263,211. Patent No. 1,810,104, dated June 16, 1931. Divided and this application March 14, 1931, Serial No. 522,779. In France March 15, 1929

8 Claims. (Cl. 23—89)

The invention which forms the subject of the present application (a division of the copending application of Ernest Govett, deceased, Serial No. 263,211, filed March 20, 1928, now Patent Number 1,810,104 issued June 16, 1931), relates to alkali bromides, and its chief object is to provide such bromides, capable of making homogeneous dispersions in water.

For making colloidal alkali metal bromides, colloidal bromine may be used, following any known method such as would produce the bromide from ordinary bromine, remembering that with colloidal bromine heat may have to be used in some cases to bring about the desired reaction. Preferably, however, the following method is employed.

A dispersion is first made of a suitable organic acid (tannic or gallic, preferably the former) and ordinary bromine, as in preparing colloidal bromine by a method described in our copending application Serial No. 522,778, filed of even date herewith, by dissolving potassium bromate in a solution of tannic acid, using 2.25 parts by weight of the acid to 1 part of the bromate, and preferably using not more than about 150 grams of the acid per liter of the solution. This produces a compound which is believed to be colloidal hydrogen bromide (HBr) and a potassium salt which appears to be a tannate ($KC_{14}H_{10}O_9$). Heating the solution to about 70° C., to insure decomposition of all the bromate, a little nitric acid is added, say 1 gram to each 15 grams of bromate used. A violent reaction ensues, due to decomposition of a little nitrogen pentoxide formed, and nearly all the tannate settles out. The solution is filtered off and allowed to stand several weeks, for further precipitation of tannate. It is then filtered again, and the filtrate is heated to about 60° C., and when it has become quite cold it is again filtered, leaving substantially pure hydrogen bromide in solution. Having thrown out the tannin as potassium tannate enough potassium or sodium hydroxide is added to the filtrate to neutralize the HBr present, thus forming potassium or sodium bromide as the case may be. The amount of potassium or sodium hydroxide which must be added to neutralize the hydrogen bromide will be obvious to the skilled chemist, and he can easily calculate its numerical value with the aid of the amount of potassium bromate originally added. The alkaline metal bromide solution is evaporated to dryness and heated to a temperature (210° to 215° C.) which will decompose the residual tannin, if any, without decomposing the bromide. The carbon of the tannin goes off apparently as $CO_2$, for the bromide thus obtained contains at most only a trace of carbon.

As used in the claims, the terms "dispersion" or "dispersed" include both true and colloidal solutions.

In accordance with the statutes we have described the invention of Ernest Govett, deceased, in such detail as will enable others, skilled in the art to which it appertains or to which it is most nearly related, to practice the invention, and we have also stated what we believe to be a correct scientific theory, but we desire it to be understood that we do not consider the invention limited to such theory or to the details referred to.

The colloidal bromides produced according to the present invention form a black or brownish black sticky, gluey residue when the water in which they are dispersed or dissolved is evaporated, becoming brittle when heated to dryness and again becoming sticky and gluey when wetted.

What is claimed as the invention of said Ernest Govett is:

1. The process of making colloidal alkali metal bromides which comprises reacting a soluble bromate with a carboxylic acid in water, whereby a hydrogen bromine compound is produced in dispersed form, causing the latter to react with an alkali metal hydroxide and evaporating the water.

2. The process of making colloidal alkali metal bromides which comprises reacting a soluble bromate with an aromatic carboxylic acid in water, whereby a hydrogen bromine compound is produced in dispersed form, causing the latter to react with an alkali metal hydroxide and evaporating the water.

3. The process of making colloidal alkali metal bromides which comprises reacting potassium bromate with an aromatic carboxylic acid in water, whereby a hydrogen bromine compound is produced in dispersed form, causing the latter to react with an alkali metal hydroxide and evaporating the water.

4. The process of making colloidal alkali metal bromides which comprises reacting a soluble bromate with one of the group consisting of tannic and gallic acids in water, whereby a hydrogen bromine compound is produced in dispersed form, causing the latter to react with an alkali metal hydroxide and evaporating the water.

5. The process of making colloidal alkali metal bromides which comprises reacting potassium bromate with one of the group consisting of tannic and gallic acids in water, whereby a hydrogen bromine compound is produced in dispersed form, causing the latter to react with an alkali metal hydroxide and evaporating the water.

6. As a new product, an alkali metal compound of bromine which is substantially identical with that produced by reacting a soluble bromate with one of the group consisting of tannic and gallic acids in water, removing the precipitate by filtration, then reacting the filtrate with an alkali metal hydroxide and evaporating the water.

7. As a new product a potassium compound of bromine which is substantially identical with that produced by reacting potassium bromate with one of the group consisting of tannic and gallic acids in water, removing the precipitate by filtration, then reacting the filtrate with an alkali metal hydroxide and evaporating the water.

8. As a new product, a colloidal alkali metal bromide dispersible in water to form a black or brownish black sticky gluey residue when the water is evaporated, becoming brittle when heated to dryness and again becoming sticky and gluey when wetted.

ERNEST H. GOVETT.
AGNES H. GOVETT.
*Executors of the Estate of Ernest Govett, Deceased.*